United States Patent Office 2,932,534
Patented Apr. 12, 1960

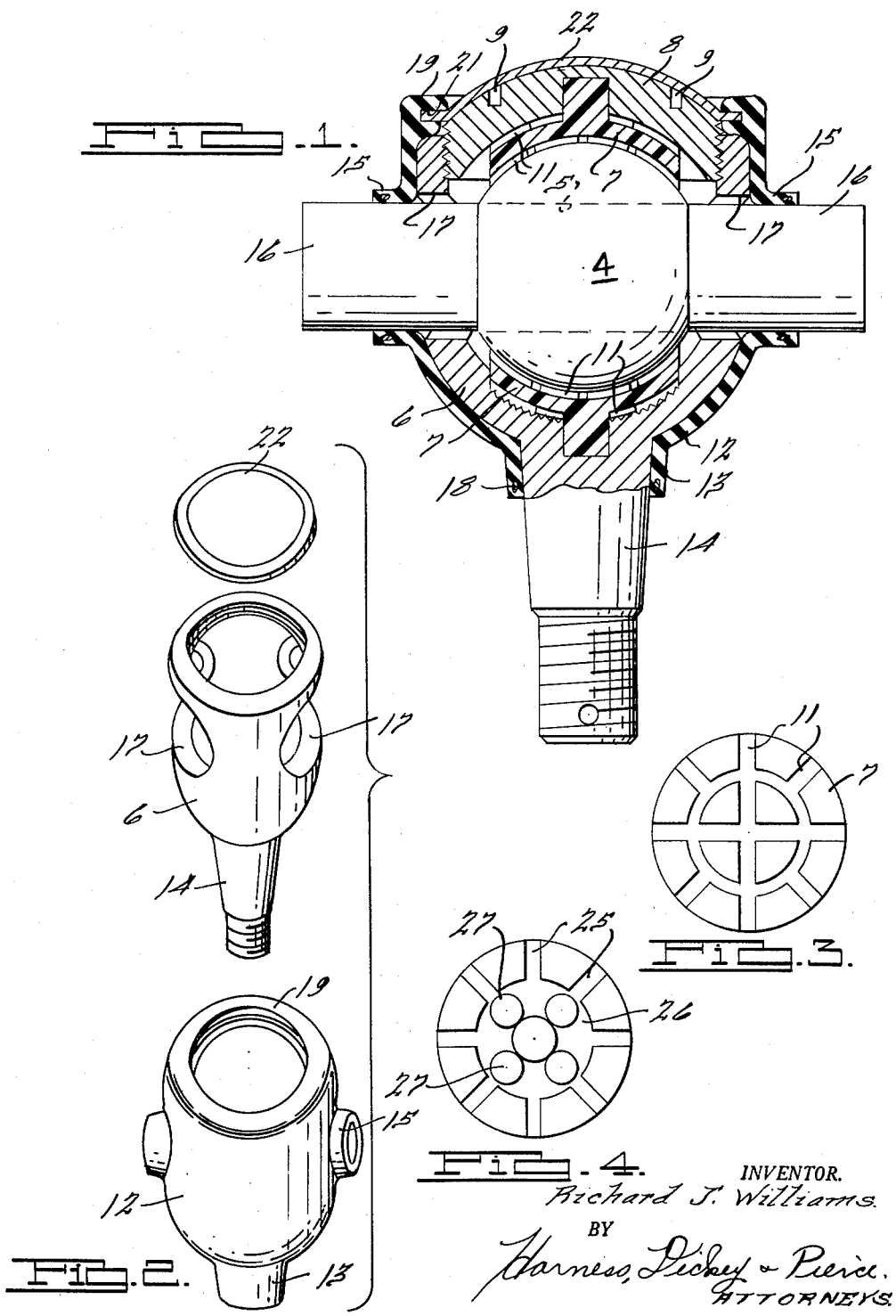

2,932,534

SEALING ELEMENT FOR BALL AND SOCKET JOINT

Richard J. Williams, Birmingham, Mich., assignor to American Metal Products Company, Detroit, Mich., a corporation of Michigan Application June 17, 1955, Serial No. 516,108

4 Claims. (Cl. 287—85)

This invention relates to ball and socket joints, and particularly to a cup-shaped sealing element and insert for a ball and socket joint.

The present invention pertains to the cup-shaped sealing element which encompasses the ball and socket assembly and provides a seal against the entrance of dust, dirt and grime into the area of the ball and inserts which would harm the mating surfaces thereof. The cup-shaped element has aligned, oppositely projecting sleeves on the wall portion thereof and a sleeve at the bottom. Metal rings are embedded in the sleeves to force the material of the sleeve into sealing relation with the stub shaft when extending through the aligned sleeve and with the stud on the socket. At the upper open end of the sleeve the material extends inwardly and is provided with an inwardly presenting slot which supports the flange of an arcuate cap of metal, plastic, rubber or other suitable material. The cup-shaped sealing element is made of rubber, plastic, metal or other suitable material which permits the stub shaft to move in the slot of the yoke without harming the material of the element.

Accordingly, the main objects of the invention are: to provide a cup-shaped sealing element for a ball and socket joint which seals the projecting supporting portions thereof; to provide a cup-shaped sealing element which encompasses the yoke portion of a ball and socket joint and which has aligned sleeves in the wall thereof for sealing a shaft which projects through the ball and a sleeve on the bottom thereof which seals to a stud on the bottom of the socket; to provide a cup-shaped sealing element with an inwardly presenting annular slot at the open end which is closed by a circular disk when the peripheral edge thereof extends within the slot; to provide a cup-shaped sealing element having aligned sleeves in the wall thereof and a sleeve in the bottom, with metal rings embedded in the sleeves and with a metal plate supported in an annular slot at the top open end of the element, and, in general, to provide a cup-shaped sealing element for a ball and socket joint which completely seals the joint and permits relative movement between the parts thereof.

Other objects and features of novelty of the invention will be specifically pointed out or will become apparent when referring, for a better understanding of the invention, to the following description taken in conjunction with the accompanying drawing, wherein:

Figure 1 is a broken sectional view of a ball and socket joint having a sealing element thereon embodying features of the present invention;

Fig. 2 is an exploded view of the sealing element and the yoke portion of the joint illustrated in Fig. 1;

Fig. 3 is a plan view of an insert employed in the joint illustrated in Fig. 1, and Fig. 4 is a bottom view of the insert illustrated in Fig. 3.

The socket on which the sealing sleeve of the present invention is employed embodies a ball 4 having a highly polished surface and an aperture 5 extending therethrough which is supported within a socket 6. An insert of resinous material 7 is placed in the bottom of the socket 6 and a cap 8, having a similar insert 7 thereon, is threaded into the open end of the socket 6. Substantial pressure is applied between the ball, inserts and socket, through the use of a spanner wrench having projections extending into apertures 9. The inserts are in the postsettable state and accurately mate with the ball so that when heat is applied to the assembly the resin of the inserts is hardened. Slots 11 are provided in the faces of the inserts which mate with the ball 4 in which a lubricant may be disposed before the final assembly of the component parts.

A cup-shaped sealing element 12 encompasses the socket 6 having an extending sleeve 13 at the bottom which slides over a stud 14 on the bottom of the socket. Diametrically aligned sleeves 15 are provided on the wall of the sealing element 12 through which a stub shaft 16 is slid for assembling the shaft through elongated slots 17 in the wall of the socket 6 and through the aperture 5 of the ball 4. The sleeves have rings 18 of metal, plastic or the like embedded therein, to force the material of the sealing element 12 into sealing engagement with the shaft 16 and the stud 14.

At the top of the sealing element 12 the material is extended inwardly at 19 and provided with a peripheral inwardly opening slot 21. A flanged disk-shaped closure element 22 extends over the cap 8, with the flange projecting into the slot 21 to form a complete closure for the ball and socket joint. The ball is free to move within the socket as the supporting shaft moves within the elongated slot 17 which is substantially wider than the shaft 16. The sealing element 12 is made of rubber, plastic or other elastic resilient material so as to permit the relative movement between the shaft 16 and the stud 14. The element 12 completely seals the joint and prevents the entrance of dirt and grime thereto which would otherwise collect on the ball and insert.

The insert 7, as illustrated in Figs. 3 and 4, is provided with recesses 11 on the concave working face for the reception of a lubricant. The convex supporting face of the insert also has recess areas 25 and 26, the latter being disposed about cylindrical projections 27. In such an arrangement, the contact area on the convex supporting face is equal to or less than the contact area on the concave mating face to assure the shaping of mating faces with the engaged surfaces of the ball and socket when pressure is applied. This results in area contact between the front and rear surfaces of the insert with the ball and socket, as each face will be capable of conforming a like amount under the applied pressure.

What is claimed is:

1. In a ball and socket joint having a cup-shaped socket with an open top, a stud extending from the bottom thereof, a closure cap enclosing the open top, a ball journaled in said socket beneath said cap, a shaft having a diameter substantially less than the diameter of the ball projecting from opposite sides of said ball through diametrically opposed apertures in the wall of the socket spaced below said cap, the improvement comprising a sealing element having a cup-shaped rubber-like body with an open top, said body having an annular sleeve at the bottom and diametrically aligned sleeves on the side walls thereof, said sealing element being adapted to fit over said socket with the annular sleeve at the bottom thereof adapted to sealingly engage said stud and the annular sleeves in the side wall thereof adapted to sealingly engage the projecting ends of said shaft, and a closure element for the open top of the sealing element.

2. In a ball and socket joint having a cup-shaped socket with an open top, a stud extending from the bottom thereof, a closure cap enclosing the open top, a ball journaled in said socket beneath said cap, a shaft having a diameter substantially less than the diameter of the ball projecting from opposite sides of said ball through diametrically opposed apertures in the wall of the socket spaced below said cap, the improvement comprising a sealing element having a cup-shaped body having an open top and made of rubber-like material, a pair of diametrically aligned annular sleeves extending outwardly of the cup-shaped body and an annular sleeve extending downwardly from the bottom thereof, said body having the material thereof extending inwardly in the open top and provided with an inwardly opening slot, said sealing element being adapted to fit over said socket with the annular sleeve at the bottom thereof adapted to sealingly engage said stud and the annular sleeves in a side wall thereof adapted to sealingly engage the projecting ends of said shaft whereby a closure element may be fitted within said inwardly opening slot to close the open top of said seal.

3. The invention as defined in claim 2 including a closure element for the open top of the sealing element extending within and supported by said inwardly opening slot.

4. The invention as defined in claim 3 including annular reinforcing inserts embedded within said sleeves.

References Cited in the file of this patent

UNITED STATES PATENTS

| | | |
|---|---|---|
| 1,806,286 | Flumerfelt | May 19, 1931 |
| 1,959,259 | Zerk | May 15, 1934 |
| 2,189,266 | Klages | Feb. 6, 1940 |
| 2,328,330 | Edington | Aug. 31, 1943 |
| 2,461,866 | Aldredge | Feb. 15, 1949 |
| 2,470,205 | Aldredge | May 17, 1949 |
| 2,726,105 | Koenig | Dec. 6, 1955 |